United States Patent
Tamura

Patent Number: 5,722,081
Date of Patent: Feb. 24, 1998

[54] DYNAMIC QUEUING SYSTEM BASED ON GPS

[75] Inventor: Takakazu Tamura, Tokyo, Japan

[73] Assignee: NEC Corporation, Tokyo, Japan

[21] Appl. No.: 651,874

[22] Filed: May 21, 1996

[30] Foreign Application Priority Data

May 22, 1995 [JP] Japan ................................. 7-122287

[51] Int. Cl.$^6$ ............................................................ H04B 7/00
[52] U.S. Cl. .......................... 455/502; 455/503; 375/356
[58] Field of Search ........................ 455/33.1, 34.1, 455/51.1, 51.2, 53.1, 54.1, 56.1, 67.1, 67.3, 67.6, 422, 423, 502, 503, 507, 517, 524; 375/354, 356; 370/503, 507

[56] References Cited

U.S. PATENT DOCUMENTS

| 4,696,051 | 9/1987 | Breeden | 455/51.2 |
| 5,287,550 | 2/1994 | Fennell et al. | 455/56.1 |

FOREIGN PATENT DOCUMENTS 2-151135  6/1990  Japan .

*Primary Examiner*—Reinhard J. Eisenzopf
*Assistant Examiner*—Thanh Le
*Attorney, Agent, or Firm*—Sughrue, Mion, Zinn, Macpeak & Seas, PLLC

[57] ABSTRACT

The object of the present invention is to perform synchronizing adjustment of reception timings of radio waves at a reception point without the necessity of an approach line and a receiving station from an exchange to a receiver and without being influenced by a condition of approach lines to all radio base stations. Exchange 10 is connected to GPS 20 and includes, in the inside thereof, approach line supervision unit 75 for supervising a condition of the approach lines and calculating transmission delay times from the condition of the approach lines, transmission time setting unit 15 for setting a time at which transmission radio waves should arrive at an overlap zone, data base 30 in which position information of the overlap zone is stored, and a controller 35 for transmitting information to the radio base stations. Radio base station 40-1 is connected to GPS 50-1 and includes, in the inside thereof, controller 46-1 for outputting a transmission message, and delay calculation unit 45-1 for calculating a radio wave arrival time from a transmitter to the overlap zone.

5 Claims, 8 Drawing Sheets

TRANSMISSION SIGNAL
FROM CALLING CONTROL
APPARATUS

TIMING AT WHICH TX$_1$
TRANSMISSION SIGNAL IS
RECEIVED BY RX

TIMING AT WHICH TX$_\eta$
TRANSMISSION SIGNAL IS
RECEIVED BY RX

PRIOR ART  TIME SIGNAL

PRIOR ART  TRANSMISSION SIGNAL

PRIOR ART    TIME SIGNAL

PRIOR ART    RECEPTION SIGNAL

PRIOR ART    TRANSMISSION SIGNAL

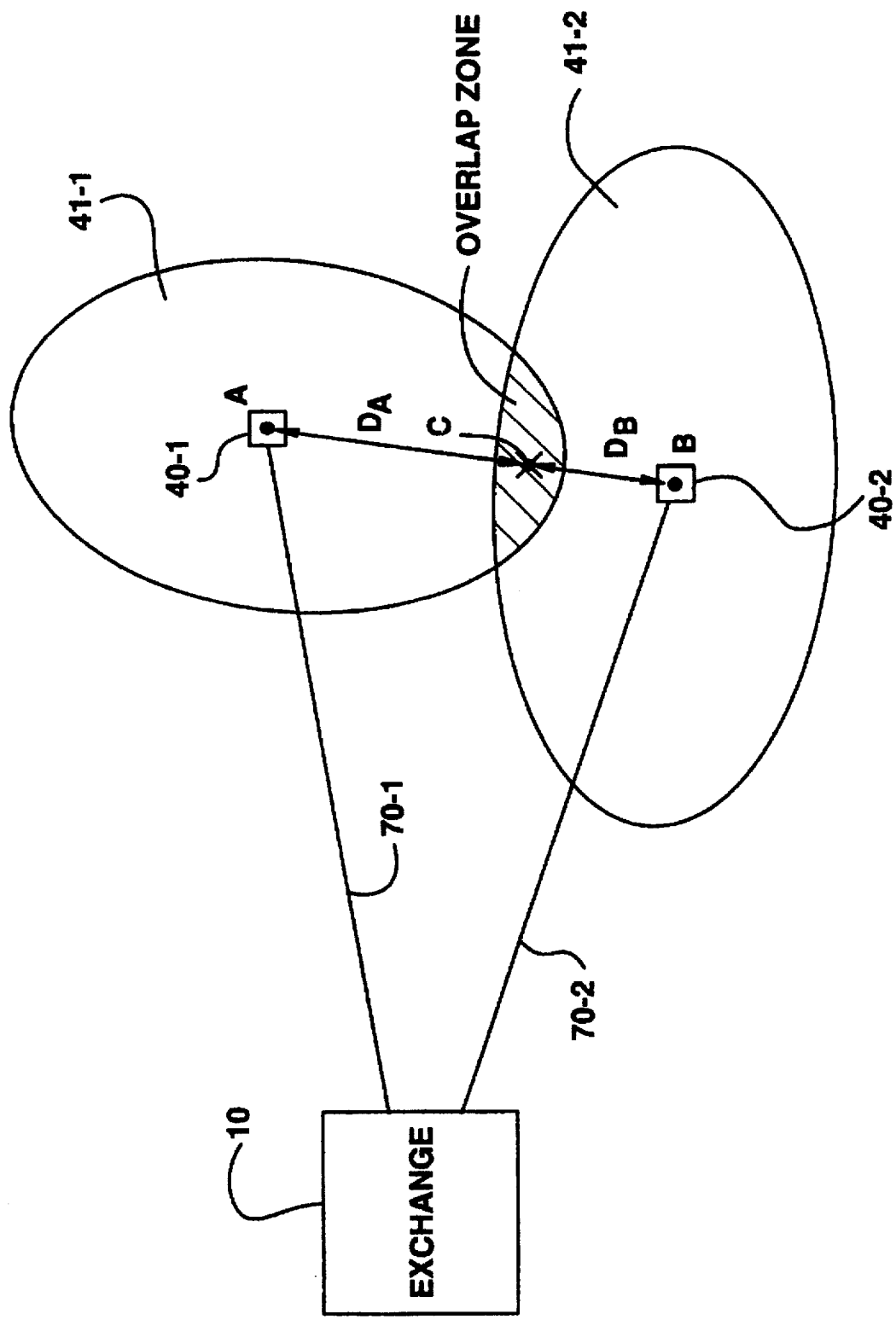

TRANSMISSION TIMING TO RADIO BASE STATION 4-1

TRANSMISSION TIMING TO RADIO BASE STATION 4-$\eta$-1

TRANSMISSION TIMING TO RADIO BASE STATION 4-$\eta$

TRANSMISSION REQUEST TIME : $T_{SD} + T_{EMAX}$

DYNAMIC QUEUING SYSTEM BASED ON GPS

BACKGROUND OF THE INVENTION

1. Field of the Invention

This invention relates to a wide area calling service which uses a same frequency in a paging service, and more particularly to a queuing system which dynamically adjusts transmission timings of radio waves transmitted from a radio base station making use of the Global Position System GPS.

2. Description of the Related Art

In a wide area calling service which uses a same frequency in a paging exchange system, in order to prevent a malfunction of a pager terminal caused by mutual interference between calling radio waves sent out from a plurality of radio base stations located in a service area, the times at which the calling radio waves from the radio base stations arrive at a reception point must coincide with each other.

In order to make the operation described above possible, the following prior arts are available:

(Prior Art 1)

FIG. 1 is a block diagram showing an example of a construction of a conventional radio calling system.

As shown in FIG. 1, calling control apparatus 510, a plurality of delay adjustment units 520-1 to 520-n and delay adjustment controller 530 are provided in exchange 500. Radio base stations 540-1 to 540-n are connected to delay adjustment units 520-1 to 520-n through approach lines 560-1 to 560-n, respectively, and receiving station 550 is connected to delay adjustment controller 530 through approach line 570.

In the system of the construction described above, transmission signals sent out from radio base stations 540-1 to 540-n are received by receiving station 550, and it is measured by calling control apparatus 510 of exchange 500 by how much the timings at which the signals are received by receiving station 550 are delayed from the timings at which the signals are sent out. Based on a result of the measurement, delay adjustment units 520-1 to 520-n are controlled by delay adjustment controller 530. Consequently, synchronizing adjustment of the timings at which the calling radio waves from radio base stations 540-1 to 540-n are received by receiving station 550 is performed.

FIG. 2 is a time chart of the signals in the construction shown in FIG. 1.

If transmission data illustrated in FIG. 2(A) are sent out from calling control apparatus 510, then calling radio waves are sent out from radio base stations 540-1 to 540-n to receiving station 550. However, the timings at which receiving station 550 receives the calling radio waves from radio base stations 540-1 to 540-n are different from one another.

For example, the timings at which receiving station 550 receives the calling radio waves from radio base station 540-1 and radio base station 540-n are displaced by different times of $T_1$ and $T_2$ from the timing of the transmission data sent out from calling control apparatus 510 as seen from FIGS. 2(B) and 2(C).

Therefore, delay adjustment controller 530 adjusts delay adjustment unit 520-1 and delay adjustment unit 520-n to eliminate the displacement in timing described above to achieve synchronizing adjustment of the reception timings by receiving station 550.

(Prior Art 2)

As another prior art, a system wherein the timing of transmission of a signal is adjusted using a time signal of an ordinary radio broadcast as a trigger is described.

FIG. 3 is a time chart of a transmission signal of an exchange when a time signal of an ordinary radio broadcast is used as a trigger, and FIG. 4 is a time chart of transmission and reception signals of a radio base station when a time signal of an ordinary radio broadcast is used as a trigger.

From an exchange, a signal is sent out later by fixed time $T_S$ than reception of a time signal as seen in FIG. 3.

The signal sent out from the exchange is received by a receiving station through a plurality of radio base stations. In this instance, the signal is received even later by fixed time $T_D$ as seen from FIG. 4. Here, $T_D$ depends upon through which radio base station the transmission data is received. Consequently, the reception timings at the receiving station of the transmission data from the different radio base stations are displaced from each other.

Therefore, timing adjustment time $T_{ADJ}$ which is different among the radio base stations is added in advance to signal arrival time TSET at the receiving station through the radio base stations as seen in FIG. 4 in order to achieve synchronizing adjustment of the reception timings by the receiving station of transmission data from the radio base stations.

The prior arts described above, however, have such problems as described below.

With the system described as prior art 1, since a measurement of the delay time can be performed only for each one of the radio base stations, transmission of radio waves from all of the other radio base stations for which no measurement is being performed must be stopped upon measurement of the delay time. Further, since the receiving station must be installed within a range within which radio waves from all of the radio base stations can be received by the receiving station, there is another problem that the locations for the radio base stations and the receiving stations are subject to restriction or, where a large number of radio base stations are involved, a large number of receiving stations and approach lines are required.

With the system described as prior art 2, since adjustment time TADJ for each of the radio base stations cannot be changed in accordance with a situation in which the radio base station is installed, the system cannot operate sufficiently against a variation of the response to a calling signal, which arises from an increase or decrease in traffic or a variation in quality of the approach line. Further, since all timings can be adjusted only for each one hour in response to a time signal, the adjustment time is liable to suffer from a displacement.

SUMMARY OF THE INVENTION

The present invention has been made in view of such problems of the prior arts as described above, and it is an object of the present invention to provide a dynamic queuing system based on the GPS which can adjust best transmission timings in accordance with an installation condition of the system to perform synchronizing adjustment of reception timings of radio waves at a reception point without the necessity for an approach line and a receiving station from an exchange to a receiver and without being influenced by a dispersion in quality of approach lines to all radio base stations or by delays of signals caused by an increase in traffic.

In order to attain the object described above, according to the present invention, there is provided a dynamic queuing system based on a GPS, comprising:

an exchange having a GPS apparatus, and a plurality of radio base stations connected to the exchange through respective approach lines and each having a GPS apparatus, wherein the exchange includes approach line supervision means for supervising the condition of the approach lines, transmission time setting means for determining a transmission request time at which transmission radio waves from the radio base stations should arrive at an overlap zone between the radio base stations based on information from the GPS apparatus of the exchange and the approach line supervision means, information storage means in which position information of the overlap zone is stored, and first control means for adding information outputted from the transmission time setting means and the information storage means to a transmission message to the radio base stations and transmitting the transmission message with the information to the radio base stations, and wherein each of the radio base stations includes delay calculation means for calculating, based on the position information of the overlap zone, a transmission time of a transmission signal to the overlap zone, and second control means for transmitting a signal at earlier than the transmission request time by the transmission time.

The dynamic queuing system based on a GPS is further characterized in that the first and second means have a storage function.

The dynamic queuing system based on a GPS is further characterized in that the transmission request time is obtained by adding a maximum value among times required when a transmission signal sent out from the exchange arrives at the overlap zone through a plurality of the radio base stations to the transmission time for radio waves received from the exchange.

The dynamic queuing system based on a GPS is characterized also in that the information regarding the transmission request time and the overlap zone is added to a header of and transmitted together with the transmission message.

In the dynamic queuing system of the present invention having the construction described above, in the exchange, a transmission request time at which transmission radio waves from the radio base stations should arrive at the overlap zone between the radio base stations is first determined based on information from the GPS and the approach line supervision means by the transmission time setting means. Then, the position information of the overlap zone stored in the information storage means, the information regarding the approach lines and the information regarding the request time at which transmission radio waves should arrive at the overlap zone are transmitted to the radio base stations by the first control means.

Then, in each of the radio base stations, a time before a transmission radio wave from the radio base station arrives at the overlap zone is calculated based on the position information of the overlap zone by the delay calculation means, and transmission of a transmission radio wave is performed by the second control means at a time earlier by the thus calculated time than the arrival request time for the transmission radio wave. Consequently, the timings at which transmission radio waves from the radio base stations are received in the overlap zone are synchronized with each other.

The above and other object, features, and advantages of the present invention will become apparent from the following description referring to the accompanying drawings which illustrate an example of a preferred embodiment of the present invention.

BRIEF DESCRIPTION OF THE DRAWINGS

FIGS. 6A–6B are a block diagram in the circuit construction showing a detailed construction of components shown in FIG. 5 and wherein FIG. 6(a) is a block diagram of the principle of an exchange and FIG. 6(b) is a block diagram of the principle of a radio base station;

FIG. 7 is a diagrammatic view embodying the dynamic queuing system based on the GPS shown in FIG. 5;

FIGS. 8A1–8A3 and 8B are a view illustrating transmission operation from the exchange to a radio base station and wherein FIGS. 8A1–8A3 are a transmission time chart from the exchange to the radio base station and FIG. 8B is a diagrammatic view showing a format of a transmission signal from the exchange to the radio base station.

DETAILED DESCRIPTION OF THE PREFERRED EMBODIMENT

An embodiment of the present invention is described below with reference to the drawings.

Figure 5:
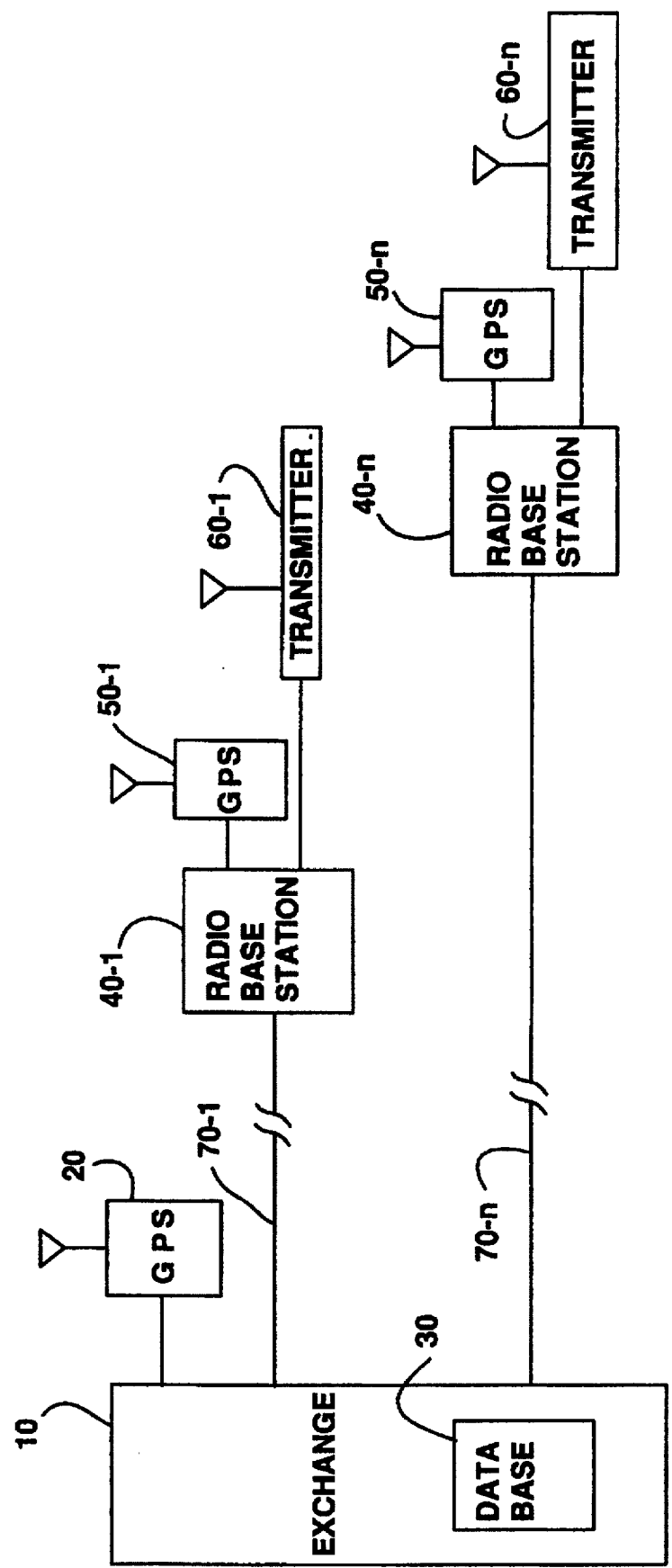
FIG. 5 is a block diagram showing an embodiment of a circuit construction applied to a dynamic queuing system based on the GPS according to the present invention.

FIG. 5 is a block diagram showing a construction of an embodiment of a dynamic queuing system based on the GPS of the present invention.

In the present embodiment, as shown in FIG. 5, the dynamic queuing system based on the GPS includes exchange 10, GPS apparatus 20 and a plurality of radio base stations 40-1 to 40-n connected to exchange 10, and a plurality of approach lines 70-1 to 70-n for connecting exchange 10 to radio base stations 40-1 to 40-n, respectively. Exchange 10 includes data base 30 serving as information storage means in which position information of overlap zones of a service area measured in advance. Meanwhile, GPS apparatus 50-1 to 50-n and transmitters 60-1 to 60-n which actually output transmission radio waves are connected to radio base station 40-1 to 40-n, respectively.

Figure 6A:
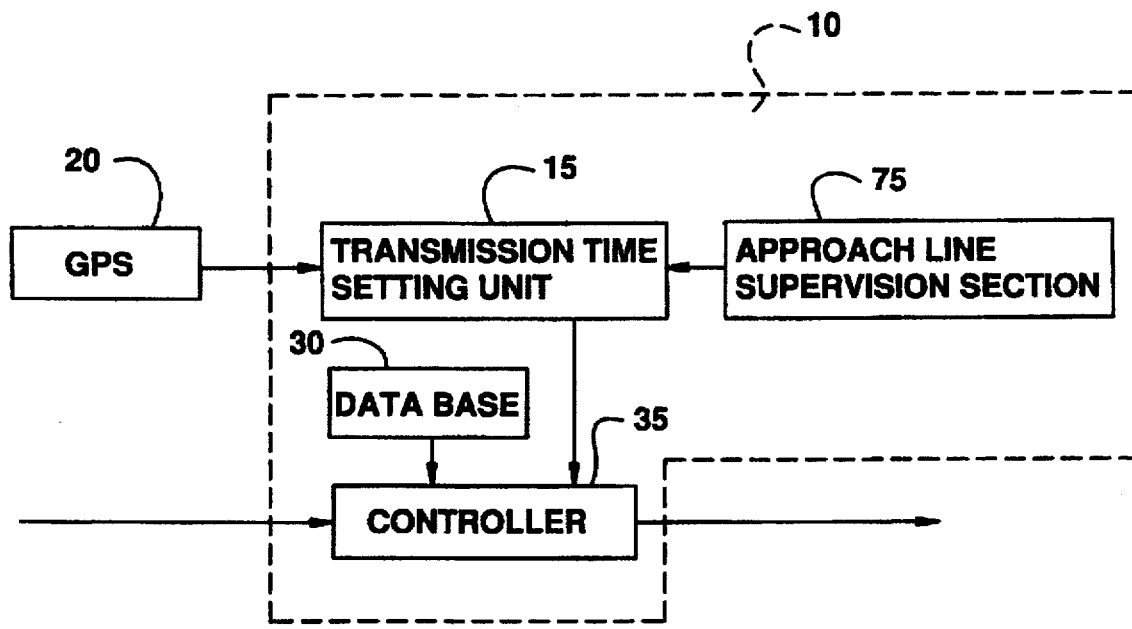
Figure 6B:
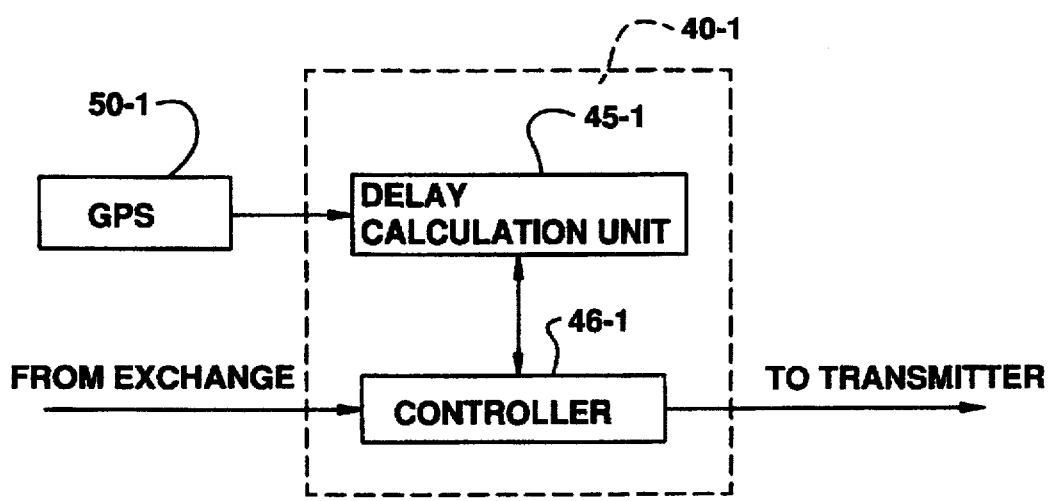

FIG. 6 is a block diagram in the circuit construction showing a detailed construction of the components shown in FIG. 5 and wherein FIG. 6(a) is a block diagram of the principle of the exchange and FIG. 6(b) is a block diagram of the principle of the radio base stations.

As shown in FIG. 6(a), exchange 10 in the present embodiment is connected to GPS apparatus 20 which outputs an absolute time. Exchange 10 includes, in the inside thereof, approach line supervision section 75 for supervising the approach lines extending to radio base stations 40-1 to 40-n and performing calculation of predicted delay times from an experience of line qualities and error occurrence times and calculation of a transmission delay time caused by overcrowding of processing arising from an increase in traffic, transmission time setting unit 15 for setting a transmission request time at which radio waves should arrive at each overlap zone between radio base stations to which radio waves are transmitted from the radio base stations based on an absolute time from the GPS apparatus 20 and a result of the calculation by approach line supervision section 75, data base 30 serving as information storage means in which position information of the overlap zones is stored, and controller 35 serving as first control means for adding information outputted from transmission time setting unit 15 and data base 30 to a transmission signal and transmitting the information to radio base stations 40-1 to 40-n.

Radio base station 40-1 in the present embodiment is connected, as shown in FIG. 6(b), to GPS apparatus 50-1 which outputs an absolute time and geographical position information. Radio base station 40-1 includes, in the inside thereof, controller 46-1 serving as second means for temporarily storing a message sent thereto from exchange 10 and outputting a transmission message at a predetermined time, and delay calculation unit 45-1 for calculating a radio wave arrival time from transmitter 60-1 to a pertaining overlap zone based on position information outputted from GPS apparatus 50-1 and position information of the overlap zone temporarily stored in controller 46-1.

FIG. 7 is a diagrammatic view embodying the dynamic queuing system based on the GPS shown in FIG. 5.

As shown in FIG. 7, approach lines 70-1 and 70-2 extend from exchange 10 to radio base stations 40-1 and 40-2 located at an A point and a B point, respectively and radio base stations 40-1 and 40-2 have coverage areas 41-1 and 41-2 to which radio waves are sent out from radio base stations 40-1 and 40-2, respectively. Here, an area in which coverage areas 41-1 and 41-2 overlap with each other (an area indicated by slanting lines around point C in FIG. 7) is an overlap zone between them at a set point, and in the overlap zone, when transmission radio waves from the radio base stations 40-1 and 40-2 are received, they must be in synchronism with each other.

However, when a error occurs due to an influence of the quality of an approach line or some other factor, since re-sending processing is performed, even if radio waves are sent out at the same time from the exchange, the times at which the radio waves transmitted from the radio base stations are received in the overlap zone are different from each other, and the radio waves are out of synchronism with each other.

Transmission operation of radio waves in the construction described above is described below.

Figure 1:
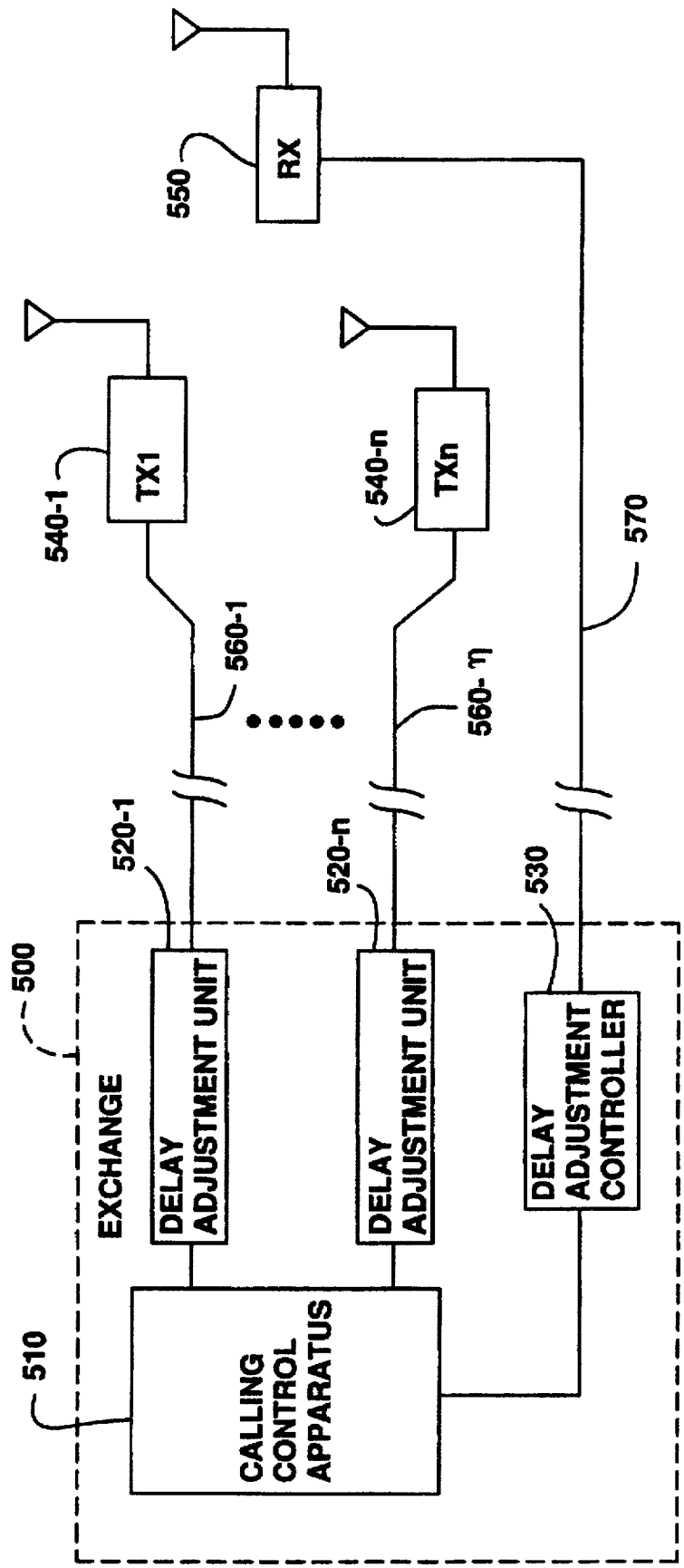
FIG. 1 is a block diagram showing an example of a construction of a conventional radio calling system.
Figure 2A:
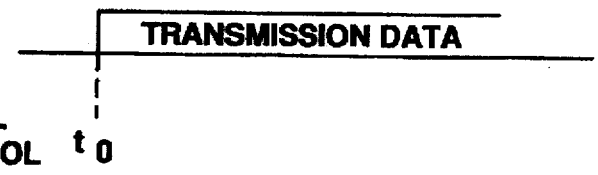
FIGS. 2A–2C are a time chart of signals in the construction shown in FIG. 1.
Figure 2B:
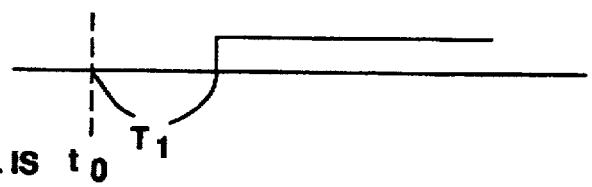
Figure 2C:
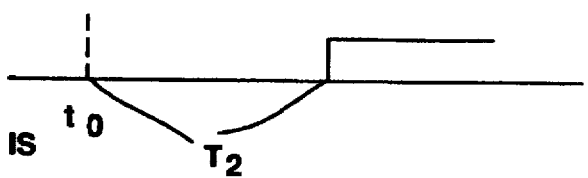
Figure 3A:
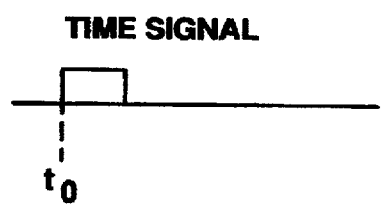
FIGS. 3A–3B are a time chart of a transmission signal of an exchange when a time signal of an ordinary radio broadcast is used as a trigger.
Figure 3B:
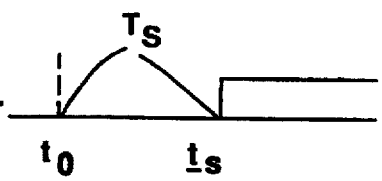
Figure 4A:
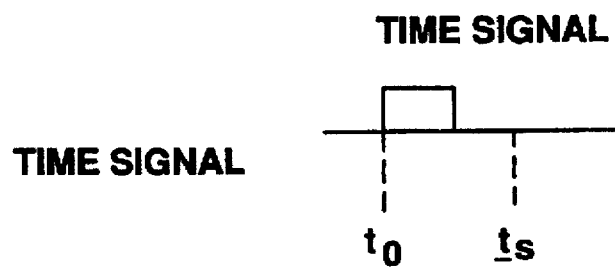
FIGS. 4A–4C are a time chart of transmission and reception signals of a radio base station when a time signal of an ordinary radio broadcast is used as a trigger.
Figure 4B:
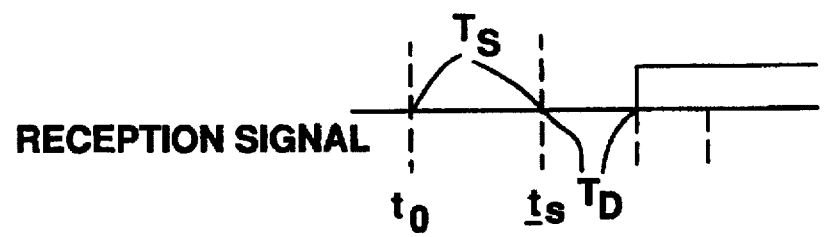
Figure 4C:
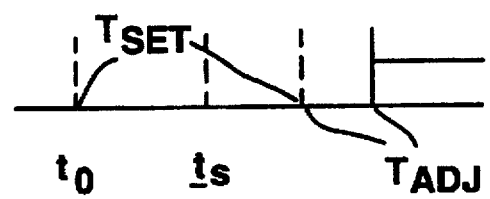
Figures 1, 8A:
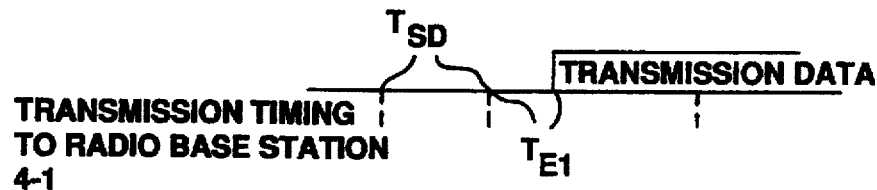
Figures 2, 8A:
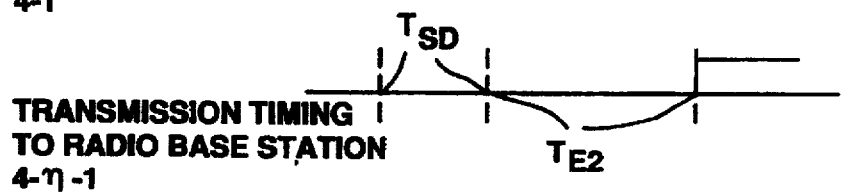
Figures 3, 8A:
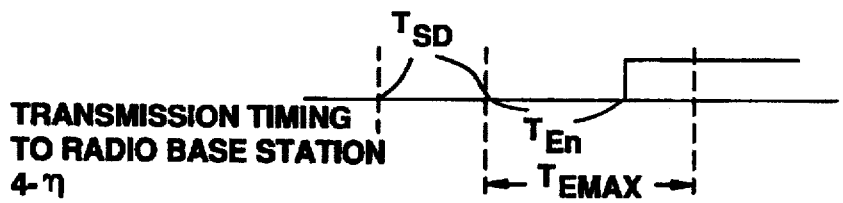
Figure 8B:
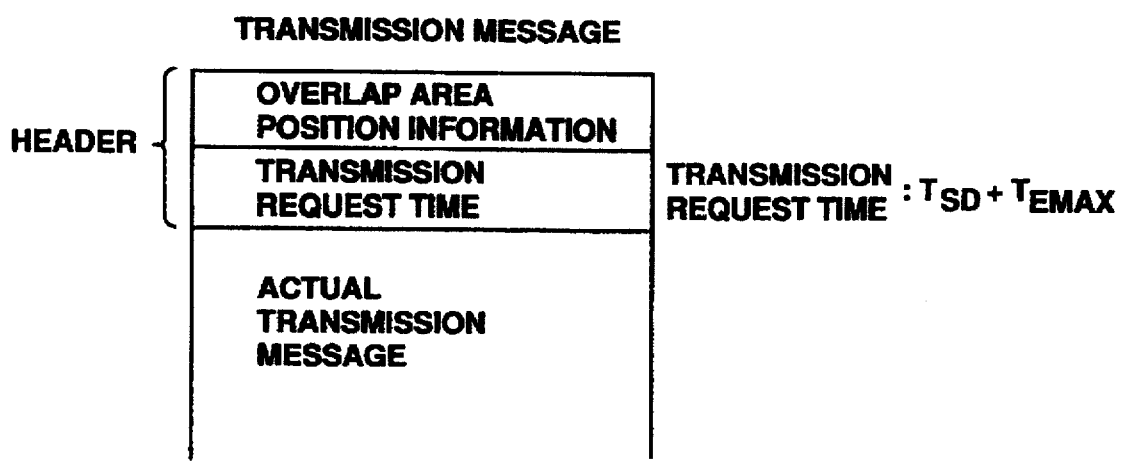

FIG. 8 is a view illustrating transmitting operations from the exchange to the radio base stations and wherein FIGS. 8A1–8A3 are a transmission time chart from the exchange to the radio base stations and FIG. 8B is a diagrammatic view showing a format of a transmission signal from the exchange to the radio base stations.

As shown in FIGS. 8A1–8A3, the timings of transmission of radio waves from exchange 10 (refer to FIG. 5) to radio base stations 40-1 to 40-n (refer to FIG. 5) are delayed $T_{E1}$, $T_{E2}$, ..., $TE_n$, respectively, by re-sending through approach lines 70-1 to 70-n (refer to FIG. 5), by overcrowding of processing caused by increase in traffic or by some other cause.

Thus, transmission delay times $T_{E1}$ to $T_{En}$ are measured by approach line supervision section 75 (refer to FIG. 6(a)) to detect maximum value $T_{Emax}$ of the transmission delay time among radio base stations 40-1 to 40-n (refer to FIG. 5).

After maximum value $T_{Emax}$ of the transmission delay time is detected, where a reference delay time in the transmitting operations from exchange 10 (refer to FIG. 5) to radio base stations 40-1 to 40-n (refer to FIG. 5), that is, a time sufficient for a message from exchange 10 (refer to FIG. 5) to arrive at radio base stations 40-1 to 40-n (refer to FIG. 5), as represented by $T_{SD}$, $T_{SD}+T_{Emax}$ is managed as a standard correction time by exchange 10 (refer to FIG. 5).

After the transmitting operations from exchange 10 (refer to FIG. 5) to radio base stations 40-1 to 40-n (refer to FIG. 5) are performed, information regarding the overlap zones is extracted from data base 30 (refer to FIG. 5) provided in exchange 10 (refer to FIG. 5), and the overlap area position information and transmission request time $T_{SD}+T_{Emax}$ are added as a header for a transmission message to form a transmission message having such a format as shown in FIG. 8B. Then, the transmission message is transmitted.

When the transmission message from exchange 10 (refer to FIG. 5) arrives at radio base station 40-1 (refer to FIG. 5), the transmission message sent thereto in the format shown in FIG. 6(b) is temporarily stored into controller 46-1. Further, the position information of the overlap zones added to the header of the transmission message is extracted and passed on to delay calculation unit 45-1.

Delay calculation unit 45-1 compares position information of radio base station 40-1 outputted from GPS apparatus 50-1 and the position information of the overlap zones with each other and calculates distances $D_A$ and $D_B$ to the overlap zone shown in FIG. 3.

Thereafter, transmission delay times are calculated based on the thus calculated distances.

Figure 9:
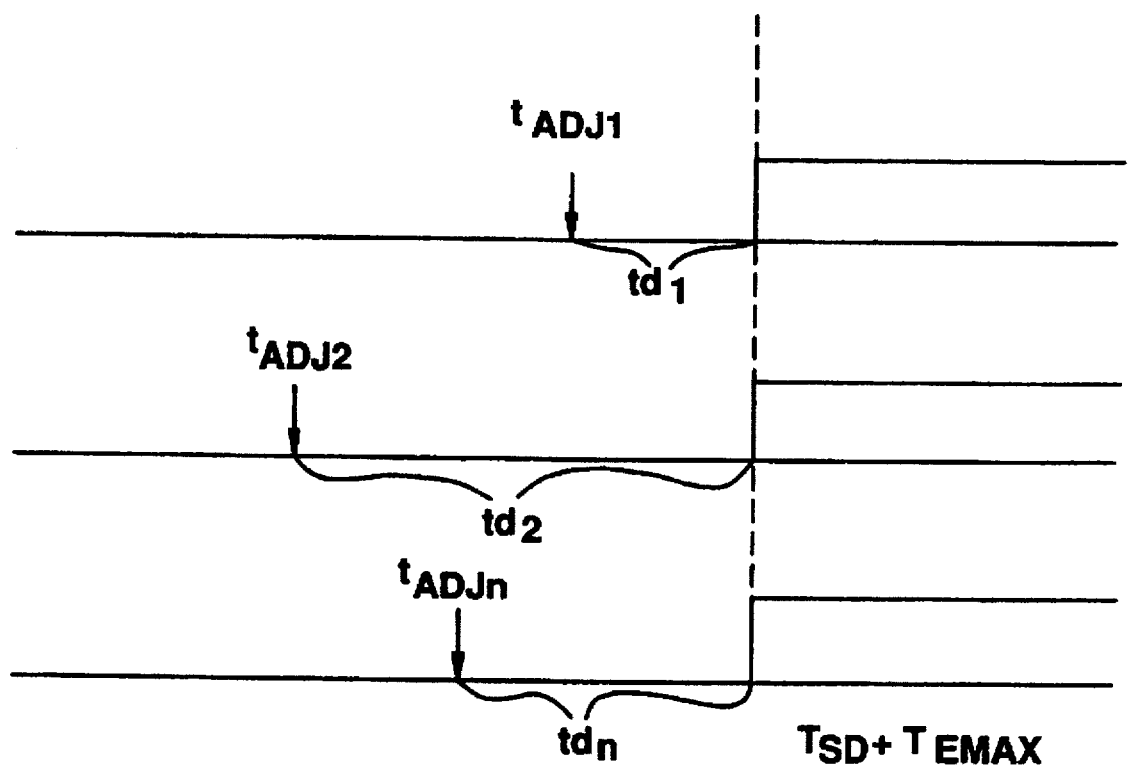
FIG. 9 is a transmission time chart when radio waves are transmitted actually from different radio base stations.

FIG. 9 is a transmission time chart when radio waves are transmitted actually from the different radio base stations.

As shown in FIG. 9, transmission of radio waves from transmitters 60-1 to 60-n (refer to FIG. 5) is performed at times $t_{ADJ1}$ to $t_{ADJn}$ earlier by delay times $t_{d1}$ to $t_{dn}$ calculated by the delay calculation unit from transmission request time $T_{SD}+T_{Emax}$ included in the respective messages.

In particular, in each of radio base stations 40-1 to 40-n (refer to FIG. 5), when the absolute time read from the GPS becomes equal to a time earlier by the arrival delay time calculated by the delay calculation unit than the transmission request time received from exchange 10 (refer to FIG. 5), radio waves are transmitted from the transmitter, thereby allowing synchronous reception of the transmission radio waves from the different base stations in the overlap zone.

Although a signal transmitted from a transmitter may have any of different specifications in terms of the rate such as POCSAG 512 bps, 1,200 bps and so forth, by taking delay times calculated from rate ratios into consideration in addition to a transmission request time as described in the present embodiment, radio waves can be transmitted with a same frequency even where the specifications are different in terms of the communication rate in propagation of radio waves described above.

Since the present invention is constructed in such a manner as described above, the following advantages are achieved.

(1) Since synchronizing adjustment between the radio base stations and the exchange is performed making use of the GPS, synchronizing adjustment can be performed without setting an approach line from the supervisory receiving station or the exchange to the receiving station. Further, adjustment of the delay times before transmission radio waves from the individual radio base stations arrive at an overlap zone can be performed without interrupting the service.

(2) Since the dynamic queuing system includes the approach line supervision means for normally supervising the approach lines, even when a transmission error occurs because of a problem of a dispersion in quality of the approach line to the radio base station or some other problem or when a delay in processing occurs as a result of an increase in traffic, an optimum transmission request time can be set.

(3) Also when it is desired to remove a radio base station or add an additional radio base station, adjustment of a propagation delay can be performed just by varying or adding data stored in the data storage means on the exchange side.

(4) Since the first and second control means have a storage function, similar processing can be performed for a plurality of transmission data.

It is to be understood that variation and modifications of a dynamic queuing system based on a GPS disclosed herein will be evident to those skilled in the art. It is intended that all such modifications and variation be included within the scope of the appended claims.

What is claimed is:

1. A dynamic queuing system based on a GPS comprising:

an exchange having a GPS apparatus, and a plurality of radio base stations connected to said exchange through respective approach lines and each having a GPS apparatus, wherein said exchange includes approach line supervision means for supervising the condition of said respective approach lines, transmission time setting means for determining a transmission request time at which transmission radio waves from said radio base stations should arrive at an overlap zone between said radio base stations based on information from said GPS apparatus of said exchange and said approach line supervision means, information storage means in which position information of said overlap zone is stored, and first control means for adding information outputted from said transmission time setting means and said information storage means to a transmission message and transmitting the transmission message with the information to said radio base stations, and wherein each of said radio base stations includes delay calculation means for calculating, based on the position information of said overlap zone, a transmission time of a transmission signal to said overlap zone, and second control means for transmitting a signal at a time earlier than the transmission request time by the transmission time.

2. A dynamic queuing system based on a GPS according to claim 1 wherein:

said first and second means have a storage function.

3. A dynamic queuing system based on a GPS according to claim 1 or 2, wherein:

the information regarding the transmission request time and said overlap zone is added to a header of and transmitted together with the transmission message.

4. A dynamic queuing system based on a GPS according to claim 1 or 2, wherein:

the transmission request time is obtained by adding a maximum value among times required when a transmission signal sent out from said exchange arrives at said overlap zone through a plurality of the said radio base stations to the transmission time for radio waves received from said exchange.

5. A dynamic queuing system based on a GPS according to claim 3, wherein the information regarding the transmission request time and said overlap zone is added to a header of and transmitted together with the transmission message.

* * * * *